United States Patent
Gataric

(10) Patent No.: US 12,051,283 B1
(45) Date of Patent: Jul. 30, 2024

(54) SYSTEMS AND METHODS OF COLLAPSE OF DRIVING DATA TO DETERMINE SPATIAL AVERAGES OF VEHICLE PATHS WITHIN AN INTERSECTION

(71) Applicant: STATE FARM MUTUAL AUTOMOBILE INSURANCE COMPANY, Bloomington, IL (US)

(72) Inventor: Alexander Gataric, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 421 days.

(21) Appl. No.: 17/188,767

(22) Filed: Mar. 1, 2021

(51) Int. Cl.
*G08G 1/01* (2006.01)
*G06F 17/18* (2006.01)
(Continued)

(52) U.S. Cl.
CPC ............ *G07C 5/008* (2013.01); *G06F 17/18* (2013.01); *G06Q 40/08* (2013.01); *G08G 1/0112* (2013.01); *G08G 1/0129* (2013.01)

(58) Field of Classification Search
CPC ........ G07C 5/008; G06F 17/18; G06Q 40/08; G08G 1/0112; G08G 1/0129
See application file for complete search history.

(56) References Cited

U.S. PATENT DOCUMENTS 6,366,851 B1 * 4/2002 Chojnacki .......... G01C 21/3819
701/467
9,311,271 B2 4/2016 Wright
(Continued)

FOREIGN PATENT DOCUMENTS

CN 106564496 A 4/2017
CN 110162050 A 8/2019
(Continued)

OTHER PUBLICATIONS

Sun, Q. et al.; "Assessing drivers' visual-motor coordination using eye tracking, GNSS and GIS: a spatial turn in driving psychology;" *Journal of spatial science*, 61(2), 2016, pp. 299-316.
Wang, Y. et al.; "Driver Identification Leveraging Single-turn Behaviors via Mobile Devices;" *29th International Conference on Computer Communications and Networks (ICCCN)*; Aug. 2020; (pp. 1-9).
(Continued)

*Primary Examiner* — Thomas Ingram
*Assistant Examiner* — Michael J Herrera
(74) *Attorney, Agent, or Firm* — MARSHALL, GERSTEIN & BORUN LLP

(57) ABSTRACT

Techniques for collapse of driving data to determine spatial averages of vehicle paths determining a spatial average vehicle path through a turn of within an intersection from a plurality of vehicles are provided. The telematics data may include plurality of spatial data points for each respective vehicle trip. Spatial data points associated with the turn of interest from each respective vehicle may be isolated and ordered chronologically, and converted into respective lines. A number of equally spaced points may be placed along each respective line, and a number of geometric median points may be determined by averaging each of the points along each of the respective lines. An average simplified line representing the spatial average vehicle path through the turn of the intersection may be generated based on the number of geometric median points.

17 Claims, 7 Drawing Sheets

(51) Int. Cl.
*G06Q 40/08* (2012.01)
*G07C 5/00* (2006.01)

(56) References Cited

U.S. PATENT DOCUMENTS

| | | | |
|---|---|---|---|
| 9,482,539 B2* | 11/2016 | Newson | G01C 21/30 |
| 9,633,487 B2 | 4/2017 | Wright | |
| 9,666,066 B2 | 5/2017 | Hiramatsu et al. | |
| 9,751,506 B2 | 9/2017 | Mudalige et al. | |
| 9,830,748 B2 | 11/2017 | Rosenbaum | |
| 9,868,393 B2 | 1/2018 | Bahgat et al. | |
| 9,990,782 B2 | 6/2018 | Rosenbaum | |
| 10,192,369 B2 | 1/2019 | Wright | |
| 10,198,879 B2 | 2/2019 | Wright | |
| 10,269,190 B2 | 4/2019 | Rosenbaum | |
| 10,269,247 B2 | 4/2019 | Ando | |
| 10,467,824 B2 | 11/2019 | Rosenbaum | |
| 11,227,452 B2 | 1/2022 | Rosenbaum | |
| 11,407,410 B2 | 8/2022 | Rosenbaum | |
| 11,524,707 B2 | 12/2022 | Rosenbaum | |
| 11,594,083 B1 | 2/2023 | Rosenbaum | |
| 2013/0304515 A1* | 11/2013 | Gryan | G06Q 40/08 705/4 |
| 2015/0285656 A1* | 10/2015 | Verheyen | G08G 1/0129 701/428 |
| 2016/0258764 A1* | 9/2016 | Phuyal | G08G 1/0104 |
| 2016/0358477 A1* | 12/2016 | Ansari | B60W 30/12 |
| 2017/0219360 A1* | 8/2017 | Cui | G01C 21/3815 |
| 2018/0025555 A1* | 1/2018 | Davidson | G06Q 10/0639 701/41 |
| 2018/0112990 A1* | 4/2018 | Fowe | G01C 21/3676 |
| 2018/0174447 A1* | 6/2018 | Pellolio | G08G 1/052 |
| 2019/0266629 A1 | 8/2019 | Bax et al. | |
| 2020/0192384 A1* | 6/2020 | Nakanishi | G01C 21/34 |
| 2020/0388156 A1 | 12/2020 | Aoude et al. | |
| 2021/0264776 A1* | 8/2021 | French | H04H 20/55 |
| 2022/0092893 A1 | 3/2022 | Rosenbaum | |
| 2022/0340148 A1 | 10/2022 | Rosenbaum | |
| 2023/0060300 A1 | 3/2023 | Rosenbaum | |

FOREIGN PATENT DOCUMENTS

| | | |
|---|---|---|
| CN | 110298122 A | 10/2019 |
| CN | 110910636 A | 3/2020 |
| CN | 111583677 A | 8/2020 |
| EP | 3239686 A1 | 11/2017 |
| EP | 3578433 B1 | 8/2020 |
| EP | 3730375 B1 | 10/2021 |
| EP | 3960576 A1 | 3/2022 |
| EP | 4190659 A1 | 6/2023 |
| EP | 4190660 A1 | 6/2023 |
| KR | 20180096463 A | 8/2018 |

OTHER PUBLICATIONS

Quddus, M.A.; "High Integrity Map Matching Algorithms for Advanced Transport Telematics Applications;" Doctoral dissertation, Imperial College London, Jan. 2006, pp. 1-258.

Brunsdon C.; "Path Estimation from GPS Tracks;" *Department of Geography, University of Leicester*, Jan. 2007 (pp. 1-9).

* cited by examiner

SYSTEMS AND METHODS OF COLLAPSE OF DRIVING DATA TO DETERMINE SPATIAL AVERAGES OF VEHICLE PATHS WITHIN AN INTERSECTION

FIELD OF THE DISCLOSURE

The present disclosure generally relates to vehicle telematics and, more particularly, to collapse of driving data to determine spatial averages of vehicle paths within an intersection using vehicle telematics data from a plurality of vehicles.

BACKGROUND

Telematics is a method of monitoring a vehicle. By combining a location determination system (e.g., the global positioning system (GPS)) data with on-board monitoring data, it is possible to record and map where a vehicle is located, how fast the vehicle is traveling or a rate of acceleration associated with the vehicle, how the vehicle is being driven (e.g., directly, based on indications of driver operation such as application of brake or gas pedals, or indirectly, e.g., high acceleration values may correlate to poor driving behavior), and, in some examples, cross reference that information with how the vehicle is operating internally.

Currently, it may be difficult to determine whether a vehicle turned through a given intersection, as well as which direction the vehicle turned through the intersection, based on vehicle telematics data alone. For instance, vehicles' paths as they turn through different intersections, as well as vehicles' paths as they make different turns through the same intersection, may have very different shapes due to factors such as the number of roads that cross at the intersection, the number of lanes of each road that crosses at the intersection, the fact that one or more roads that cross at the intersection may be one-way roads, the speed limits associated with the one or more roads that cross at the intersection, the elevations of the one or more roads that cross at the intersection, and many other factors. However, this detailed information about various intersections may be difficult to obtain or difficult to access. Moreover, it may be difficult to distinguish between the path of a vehicle that is making a turn through an intersection compared to the path of a vehicle that makes a U-turn (i.e., never actually turns through the intersection), or the path of a vehicle that turns into a parking lot prior to the intersection.

SUMMARY

In an aspect, a computer-implemented method is provided, comprising: obtaining, by a processor, telematics data from a plurality of vehicle trips made by a plurality of vehicles that include a turn of interest through a particular intersection, the telematics data including a plurality of spatial data points for each respective vehicle trip; isolating, by the processor, from the spatial data points for each respective vehicle trip, the spatial data points associated with the turn of interest from each respective vehicle trip; ordering, by the processor, each isolated set of spatial data points associated with the turn of interest from each respective vehicle trip chronologically; converting, by the processor, the chronologically ordered spatial data points associated with the turn of interest from each respective vehicle trip into a first line for each respective vehicle trip; converting, by the processor, the first line associated with the turn of interest for each respective vehicle trip into a simplified line associated with the turn of interest for each respective vehicle trip, each of the respective simplified lines having fewer spatial data points than each of the respective first lines; marking, by the processor, a particular number of equally spaced points along each of the simplified lines associated with the turn of interest for each respective vehicle trip, such that each of the points are marked at linear fractions of the line at regular intervals; determining, by the processor, a particular number of geometric median points, with each geographic median point being an average of a respective one of the particular number of equally spaced points placed at a particular linear fraction along the simplified lines associated with the turn of interest from each of the vehicle trips; and generating, by the processor, an average simplified line associated with the turn of interest for all of the vehicle trips by joining the geometric median points together in order of the linear fractions of the lines.

In another aspect, a non-transitory computer-readable storage medium is provided, comprising instructions that, when executed, cause a machine to: obtain telematics data from a plurality of vehicle trips made by a plurality of vehicles that include a turn of interest through a particular intersection, the telematics data including a plurality of spatial data points for each respective vehicle trip; isolate, from the spatial data points for each respective vehicle trip, the spatial data points associated with the turn of interest from each respective vehicle trip; order each isolated set of spatial data points associated with the turn of interest from each respective vehicle trip chronologically; convert the chronologically ordered spatial data points associated with the turn of interest from each respective vehicle trip into a first line for each respective vehicle trip; convert the first line associated with the turn of interest for each respective vehicle trip into a simplified line associated with the turn of interest for each respective vehicle trip, each of the respective simplified lines having fewer spatial data points than each of the respective first lines; mark a particular number of equally spaced points along each of the simplified lines associated with the turn of interest for each respective vehicle trip, such that each of the points are marked at linear fractions of the line at regular intervals; determine a particular number of geometric median points, with each geographic median point being an average of a respective one of the particular number of equally spaced points placed at a particular linear fraction along the simplified lines associated with the turn of interest from each of the vehicle trips; and generate an average simplified line associated with the turn of interest for all of the vehicle trips by joining the geometric median points together in order of the linear fractions of the lines.

In still another aspect, a computing device is provided, comprising a processor and a memory storing instructions that, when executed by the processor, cause the processor to: obtain telematics data from a plurality of vehicle trips made by a plurality of vehicles that include a turn of interest through a particular intersection, the telematics data including a plurality of spatial data points for each respective vehicle trip; isolate, from the spatial data points for each respective vehicle trip, the spatial data points associated with the turn of interest from each respective vehicle trip; order each isolated set of spatial data points associated with the turn of interest from each respective vehicle trip chronologically; convert the chronologically ordered spatial data points associated with the turn of interest from each respective vehicle trip into a first line for each respective vehicle trip; convert the first line associated with the turn of interest for each respective vehicle trip into a simplified line associated with the turn of interest for each respective vehicle trip, each of the respective simplified lines having fewer spatial data points than each of the respective first lines; mark a particular number of equally spaced points along each of the simplified lines associated with the turn of interest for each respective vehicle trip, such that each of the points are marked at linear fractions of the line at regular intervals; determine a particular number of geometric median points, with each geographic median point being an average of a respective one of the particular number of equally spaced points placed at a particular linear fraction along the simplified lines associated with the turn of interest from each of the vehicle trips; and generate an average simplified line associated with the turn of interest for all of the vehicle trips by joining the geometric median points together in order of the linear fractions of the lines.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

Figure 1:
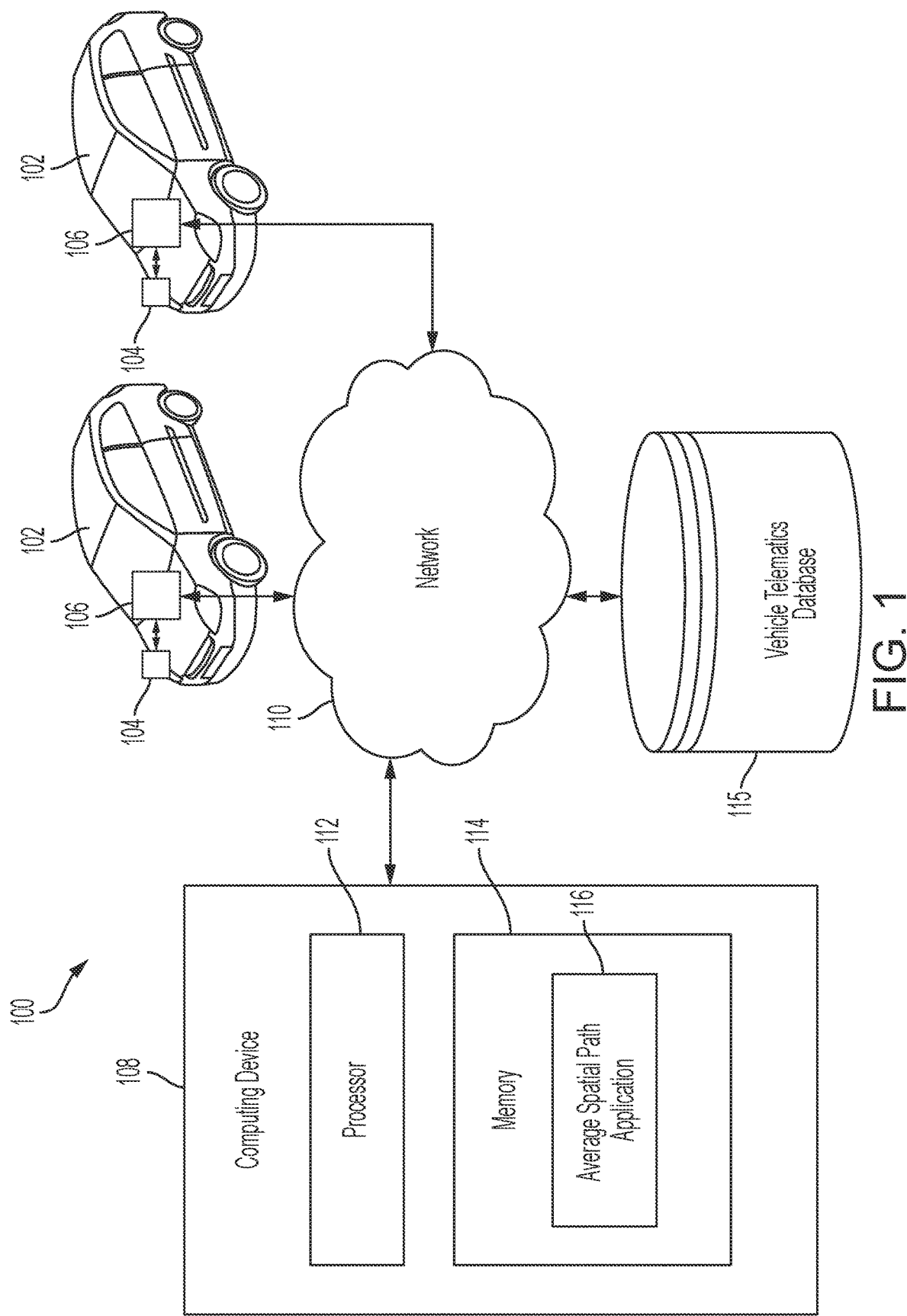
FIG. 1 illustrates a block diagram of an example system for collapse of driving data to determine spatial averages of vehicle paths within an intersection, in accordance with some embodiments.

The present application provides techniques for generating an average spatial path for a plurality of vehicles that make a particular turn through a particular intersection. For instance, an average spatial path for North-to-East turns though a given intersection may be generated, as well as distinct spatial average paths for East-to-North turns, North-to-West turns, West-to-North turns, etc., through the same intersection using the techniques provided herein.

Telematics data from a number of vehicle trips from a plurality of vehicles including an intersection turn of interest may be obtained, and for each trip, the data points for the time that the vehicle is within the intersection may be isolated. Duplicate spatial data points from the same trip (e.g., from a vehicle stopped in the intersection) may be combined as needed. After this combining step, the data points for each vehicle trip may ordered by time and converted into a line, which may then be converted into a simplified line with fewer points than the original line. A number of equally spaced points are placed or marked along the simplified line for each vehicle trip (e.g., 10 points along each line), such that one point is placed, e.g., at a point 10% along the line, and the next point is placed, 20% along the line, etc., and a geometric median for each point placed at a particular linear fraction along its respective line is determined, e.g., using the Weiszfeld algorithm. That is, the first points of each of the simplified lines, each placed at 10% of each respective simplified line, are averaged to produce a geometric median for the first point, the second points of each of the simplified lines are averaged to produce a geometric median for the second point, etc., for all of the equally spaced points placed along each line. An average simplified line may then be generated by joining the geometric median points together in order of the linear fractions, such that the geometric median point created by averaging the points 10% along their respective simplified lines is joined to the geometric median point created by averaging the points 20% along their respective simplified lines, which is in turn joined to the geometric median point created by averaging the points 30% along their, respective simplified lines, etc. Although the use of 10 points, each placed 10% along each line is discussed above, there may be any number of points evenly placed along each line in various embodiments. For instance, there may be 20 points, each placed 5% along each line, of 5 points, each placed 20% along each line, etc.

To exclude any invalid trips through the intersection (e.g., U-turns, or instances in which vehicles are turning into a parking lot or exit prior to the intersection), the generated average simplified line is then compared to each of the original simplified lines for each vehicle trip, and a spatial distance is calculated between the generated average simplified line and each of the original simplified lines, in which case any of the original simplified lines associated with a spatial distance to the average simplified line that is greater than a threshold value are then excluded.

In some examples, calculating this spatial distance includes calculating a Hausdorff distance or a Fréchet distance between the two lines. Moreover, in some examples, calculating this spatial distance includes dividing each of the original simplified lines into a number of segments equal to the number of geometric median points that were used to generate the average simplified line, and comparing each segment of each of the original simplified lines to the corresponding segment of the average simplified line. For instance, the distance of each node on each of the original simplified lines may be compared to the corresponding node of the average simplified line, and minimum, maximum, and average distances between each of the node from original simplified lines and the corresponding node of the average simplified line may be determined. Similarly, the angles (e.g., 0-360) of each segment on each of the original simplified lines may be compared to the angle of the corresponding segment of the average simplified line to determine a difference in angles, and minimum, maximum, and average differences in angles between each of the segments on each of the original simplified lines and the corresponding segment of the average simplified line may be determined. In this case, original simplified lines for which the node distances or angle differences exceed threshold values may be excluded.

After some original simplified lines are excluded, the geometric median procedure is repeated again for the remaining simplified lines to generate a new average simplified line. This process may be iteratively repeated until none of the remaining original simplified lines have spatial distances, node distances, and/or angle differences greater than the respective threshold values for each when compared to the average simplified line.

This final average simplified line may then be used as the spatial average path of vehicles making a particular turn through a particular intersection. New vehicle trip data can be compared against this average line to determine whether the vehicle turned through the intersection, and to identify any deviations between the vehicle's turn through the intersection and the average path through the intersection, which may be indicative of vehicles that do not actually travel through the intersection (e.g., instead making a U-turn, or turning into a nearby parking lot), or vehicles driving unsafely or otherwise erratically through the intersection.

For instance, a simplified line representative of a new vehicle's path as it makes a turn through the intersection can be segmented into the same number of segments as were used to create the average simplified line, and compared to the spatial average path of vehicles making the turn through the intersection to calculate the spatial distance between the simplified line representative of the new vehicle's path as it makes a turn through the intersection and the spatial average path of vehicles making the turn through the intersection (i.e., in the same manner as original simplified lines were compared to the average simplified lines to determine which to exclude). If the spatial distance for the new vehicle's path through the turn of the intersection is greater than the threshold value, this may indicate that the vehicle is not actually travelling through the intersection, or that the vehicle is traveling through the intersection in an unsafe manner.

Additionally, in some examples, only the vehicle data from trips that are used in creating the final average simplified line (i.e., none of the vehicle data from trips that were excluded in the iterative process of creating the final average simplified line) may be used in calculating other types of averages associated with the turn through the intersection. For instance, average driving values, such as an average maximum acceleration value, an average maximum speed value, an average braking value, etc., associated with trips through the intersection may be calculated using only telematics data from trips that were used in creating the final average simplified line (i.e., not including any telematics data from trips that were excluded). In this way, the average driving values are not skewed by outlier trips through the intersection, or trips that did not actually include the particular turn through the intersection (e.g., U-turns, or turns into nearby parking lots, etc.). These average driving values can then be compared to driving values for a new trip through the turn of the intersection to determine if the vehicle's maximum acceleration, speed, braking, etc., through the turn of the intersection during the new trip was average, below average, above average, etc.

Advantageously, compared to conventional methods, which require defined roads in order to determine anything about a vehicle's turn through an intersection, the techniques provided herein derive road data using only driving data within a defined box-shaped intersection, remove outliers, and create a refined definition. That is, the techniques provided herein do not rely on pre-defined road data from external sources, which may be out of date or otherwise inaccurate, or expensive to obtain. Instead, the techniques provided herein derive the shape of the road based on the driving data from actual vehicles that drive through the intersection. Moreover, compared to conventional methods, the techniques provided herein require fewer steps and are thus performed more quickly by processors, saving both time and processing power compared to conventional methods.

FIG. 1 illustrates a block diagram of an example system 100 for collapse of driving data to determine spatial averages of vehicle paths within an intersection, in accordance with some embodiments. The high-level architecture illustrated in FIG. 1 may include both hardware and software applications, as well as various data communications channels for communicating data between the various hardware and software components, as is described below.

The system 100 may include a plurality of vehicles 102, each equipped with various sensors 104. The sensors 104 of each vehicle 102 may communicate, via a wired or wireless connection, with respective vehicle computing devices 106. In some examples, the vehicle computing devices 106 may be on-board computing devices. The vehicle computing devices 106 may communicate with another computing device 108, e.g., via signals sent over a network 110. For instance, the vehicle computing devices 106 may send telematics data or other measurements captured by the sensors 104 to the computing device 108 via the network 110.

The sensors 104 may include location sensors (e.g., GPS) and motion sensors (e.g., accelerometers, gyrometers, etc.) and other suitable vehicle telematics sensors configured to capture indications of the motion and operation of the respective vehicles 102 over time, as well as a clock function configured to timestamp various sensor readings and vehicle telematics data captured by the sensors 104.

The computing device 108 may include one or more processors 112 and a memory 114. The one or more processors 112 may interact with the memory 114 to obtain, for example, computer-readable instructions stored in the memory 114. The computer-readable instructions stored in the memory 114 may cause the one or more processors 112 to store telematics data sent by the vehicle computing device 106 in a vehicle telematics database 115, to access telematics data from the vehicle telematics database 115, and/or to execute one or more applications, such as an average spatial path application 116.

Executing the average spatial path application 116 may include obtaining telematics data from a plurality of vehicle trips made by a plurality of vehicles 102 that include a turn of interest through a particular intersection. For instance, executing the average spatial path application 116 may include obtaining telematics data from the vehicle telematics database 115 that includes vehicle trips that include a North-West turn through the intersection of Street A and Street B. The vehicle telematics data may include a series of spatial data points for each vehicle trip made by the vehicles 102. Executing the average spatial path application 116 may further include isolating the spatial data points that are from the turn of interest from each of the vehicle trips. For instance, spatial data representative of a boundary associated with a particular intersection may be obtained, and the boundary associated with the particular intersection may be compared to the spatial data points from each vehicle trip, such that spatial data points from each vehicle trip within the boundary associated with the intersection are included and spatial data points from each vehicle trip outside of the boundary associated with the intersection are excluded. The remaining spatial data points are thus the portions of each vehicle trip that include the intersection. These spatial data points from the portion of each vehicle trip that includes the intersection may be ordered chronologically and a simplified line may then be generated for the portion of each vehicle trip that includes the intersection. These new simplified lines may then be divided into three equal segments. An angle measurement from 0 to 360 may be determined for both the first segment (i.e., the first third) and the last segment (i.e., the last third) of each line, from each vehicle trip. The directions associated with the turns through the intersection from each vehicle trip may then be determined based on these two angle measurements. Thus, the spatial data points from each vehicle trip that includes a particular direction turn through a particular intersection (e.g., a North-West turn through a particular intersection) may be isolated, so that spatial data from vehicle trips that do not pass through the intersection, and spatial data from vehicle trips that make different direction turns through the intersection are excluded from the isolated spatial data points.

Executing the average spatial path application 116 may further include ordering each isolated set of spatial data points from the turn of interest from each vehicle trip chronologically, i.e., based on the timestamp of each spatial data point. Executing the average spatial path application 116 may include deleting any duplicate spatial data points (i.e., any spatial data points associated with the same location).

Figure 2A:
FIGS. 2A-2D illustrate diagrams of example steps of a method for collapse of driving data to determine spatial averages of vehicle paths within an intersection, in accordance with some embodiments.

Executing the average spatial path application 116 may further include converting each chronologically-ordered set of spatial data points associated with the turn of interest from each respective vehicle trip into a line representative of the vehicle 102's turn through the intersection. In some examples, this converted line may be a simplified line, i.e., having fewer spatial data points than the initial set of spatial data points. FIG. 2A illustrates an example rendering of lines representing a plurality of vehicles' 102 west-to-south turns through the intersection.

Figure 2B:
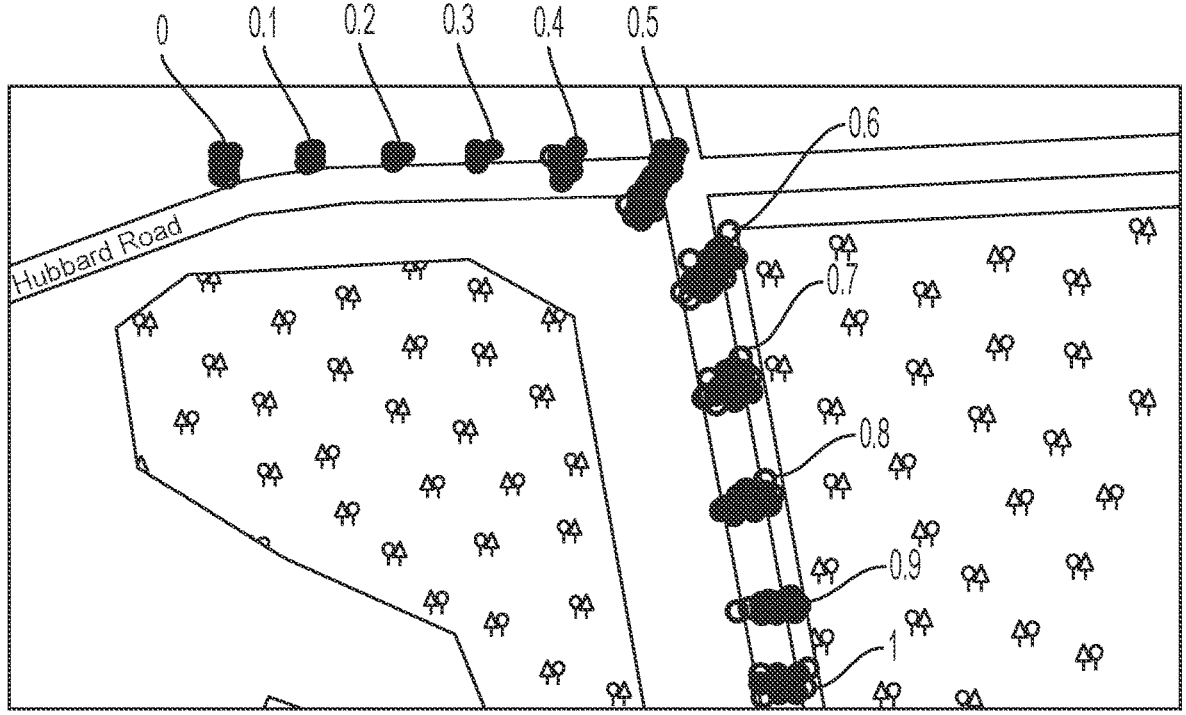

Executing the average spatial path application 116 may further include marking a number of equally spaced points along each line. That is, the same number of points may be marked along each line, such that a first point is placed 10% along the line, a second point is placed 20% along the line, a third point is placed 30% along the line, etc., for each line. FIG. 2B illustrates an example rendering of the equally spaced points along each of the lines shown in FIG. 2A. Executing the average spatial path application 116 may further include determining a number of geometric median points by averaging the equally spaced points placed at a particular linear fraction from each line, which may be done using the Weiszfeld algorithm. Generally speaking, the Weiszfeld algorithm is a form of iteratively re-weighted least squares. This algorithm defines a set of weights that are inversely proportional to the distances from the current estimate to the points, and creates a new estimate that is the weighted average of the sample according to these weights.

Figure 2C:
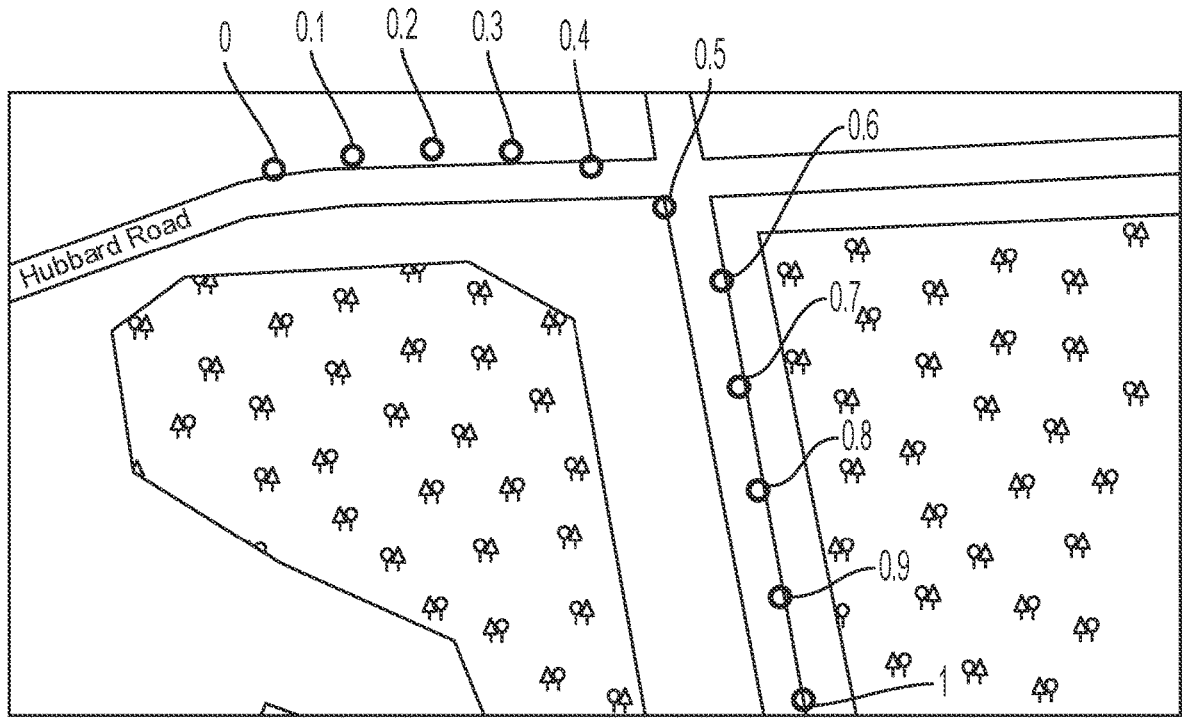

That is, the first points, each placed 10% along each of the lines, may be averaged, e.g., using the Weiszfeld algorithm, to determine a first geometric median point, and the second points, each placed 20% along each of the lines, may be averaged to determine a second geometric median point, and the third points, each placed 30% along each of the lines may be averaged to determine a third geometric median point, etc. FIG. 2C illustrates an example rendering of the geometric median points generated by averaging the points shown in FIG. 2B.

Figure 2D:
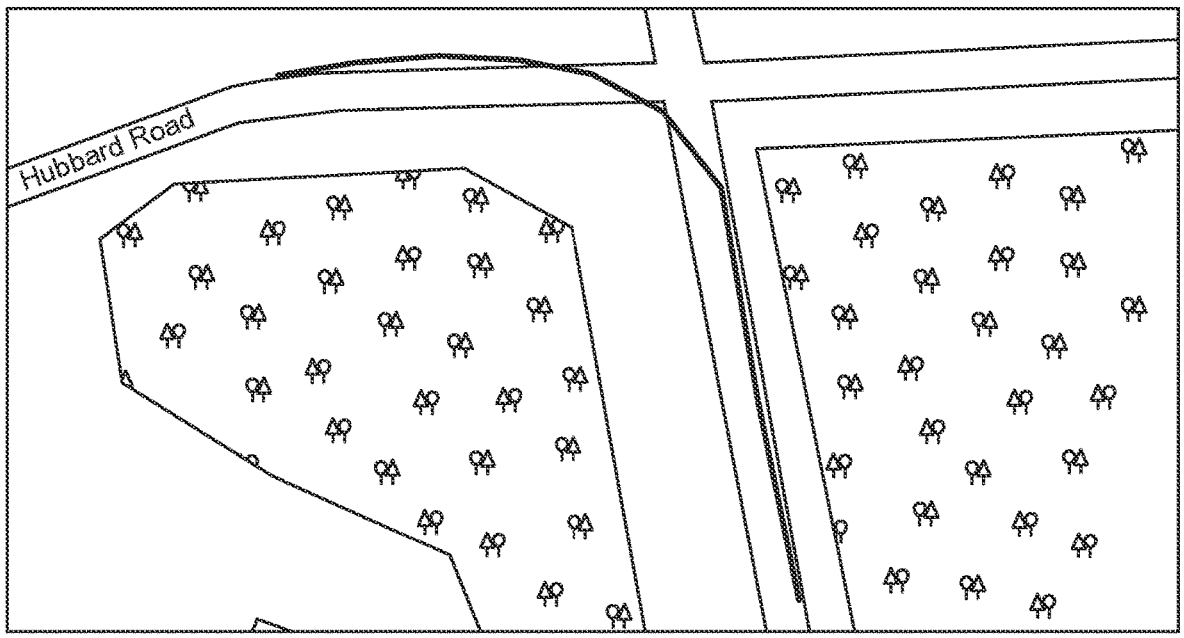

Executing the average spatial path application 116 may further include generating an average simplified line associated with the turn of interest for all of the vehicle trips based on the geometric median points. In particular, this line may be created by joining each of the geometric median points together in order of linear fractions, such that the geometric median point created by averaging each of the points placed 10% along each of the lines is joined to the geometric median point created by averaging each of the points placed 20% along each of the lines, which is in turn joined to the geometric median point created by averaging each of the points placed 30% along each of the lines, etc. FIG. 2D illustrates an example simplified line generated based on the geometric median points shown in FIG. 2C.

In some examples, executing the average spatial path application 116 may further include calculating a spatial distance between each of the lines associated with the plurality of vehicle trips and the generated average simplified line. In some examples, calculating this spatial distance includes calculating a Hausdorff distance or a Fréchet distance between the two lines. Generally speaking, a Hausdorff distance, or Hausdorff metric, also called Pompeiu-Hausdorff distance, measures how far two subsets of a metric space are from each other, and a Fréchet distance is a measure of similarity between curves that takes into account the location and ordering of the points along the curves.

Moreover, in some examples, calculating this spatial distance includes dividing each of the original simplified lines into a number of segments equal to the number of geometric median points that were used to generate the average simplified line, and comparing each segment of each of the original simplified lines to the corresponding segment of the average simplified line. For instance, the distance of each node on each of the original simplified lines may be compared to the corresponding node of the average simplified line, and minimum, maximum, and average distances between each of the node from original simplified lines and the corresponding node of the average simplified line may be determined. Similarly, the angles (e.g., 0-360) of each segment on each of the original simplified lines may be compared to the angle of the corresponding segment of the average simplified line to determine a difference in angles, and minimum, maximum, and average differences in angles between each of the segments on each of the original simplified lines and the corresponding segment of the average simplified line may be determined. In this case, original simplified lines for which the node distances or angle differences exceed threshold values may be excluded.

The average spatial path application 116 may generate an updated average simplified line associated with the turn of interest using the remaining lines (i.e., the lines that were not deleted). This process may continue iteratively until there are no remaining lines that have a spatial distance to the generated average simplified line associated with the turn of interest that is greater than a threshold spatial distance. The average spatial path application 116 may then use the final updated generated average simplified line as the average spatial path for the turn of interest.

For instance, in some examples, executing the average spatial path application 116 may include comparing a line representative of a new vehicle trip (i.e., generated based on telematics data from a trip made by a new vehicle 102) to the average spatial path to determine, e.g., whether the vehicle 102 made the turn of interest during the new vehicle trip, and/or whether the vehicle 102 made the turn of interest in a deviant manner compared to the average turn through the intersection during the new vehicle trip. Comparing the new vehicle trip to the average spatial path may be done in the same manner as comparing the original simplified lines to the average simplified line, as discussed above, i.e., by calculating a Hausdorff or Frechet distance between the new vehicle trip and the average spatial path, or by segmenting the line representative of the new vehicle trip into the same number of segments, and comparing node distances and/or angle differences to determine if any thresholds are exceeded.

Figure 3A:
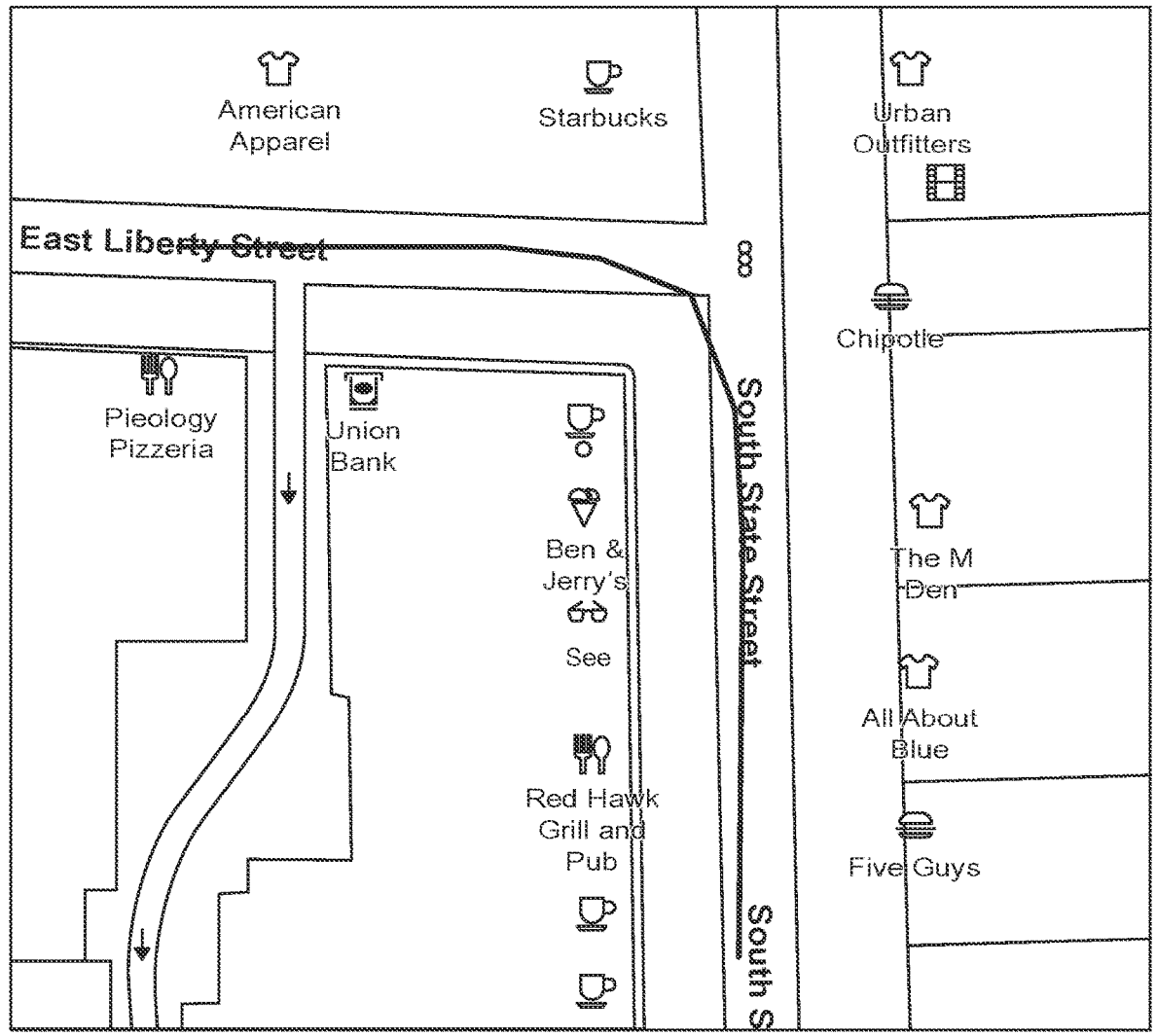
FIG. 3A illustrates an diagram of an example spatial average vehicle path through an intersection, in accordance with some embodiments.
Figure 3B:
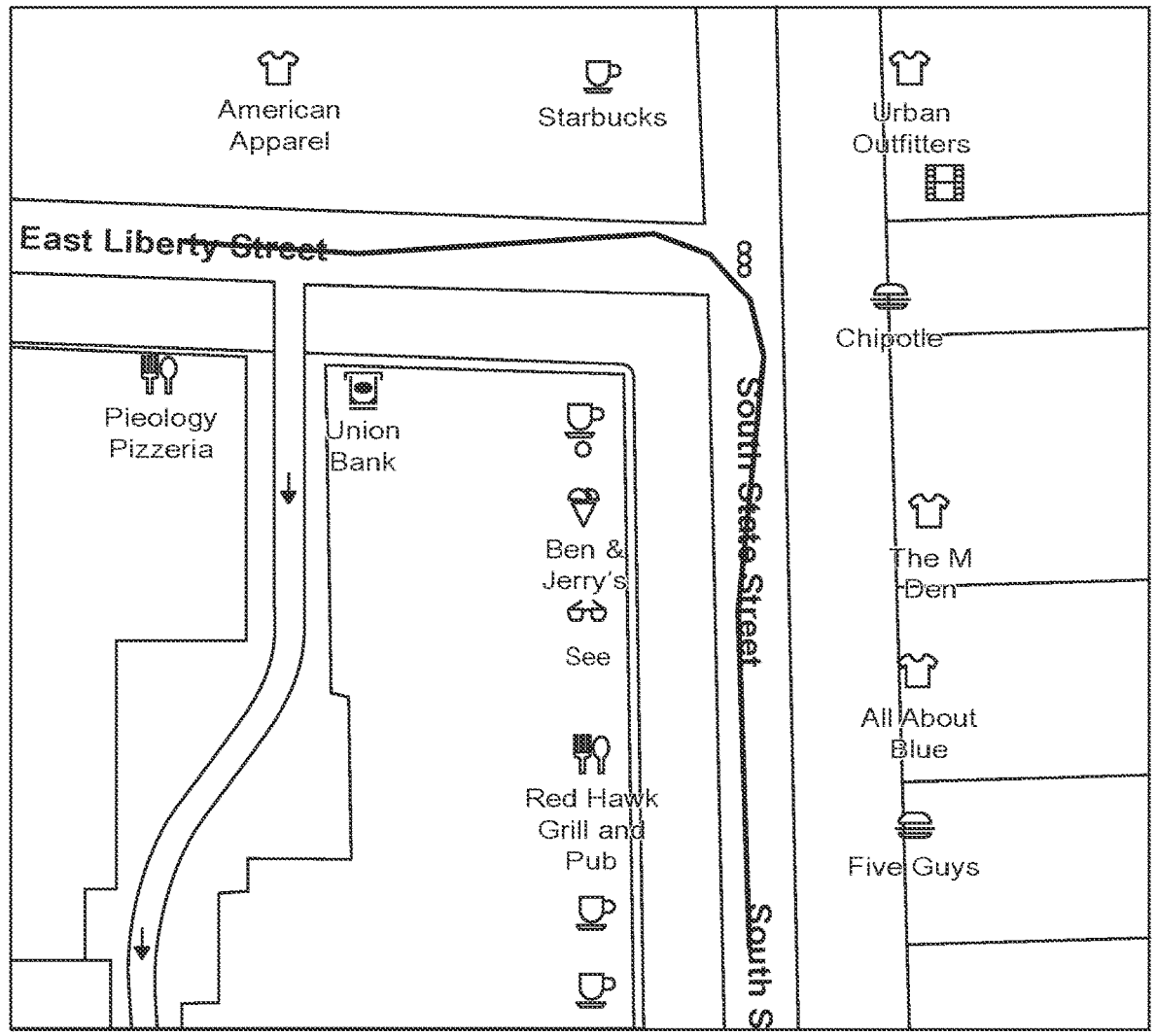
FIG. 3B illustrates a diagram of an example vehicle path through an intersection that may be compared to the example spatial average vehicle path through the intersection of FIG. 3A to determine that the vehicle likely made the same turn through the intersection, in accordance with some embodiments.

For instance, FIG. 3A illustrates a rendering of an example average spatial path of a turn through a given intersection. FIG. 3B illustrates a rendering of an example line representative of a turn made by a vehicle 102 during a new vehicle trip. The average spatial path application 116 may compare the line from FIG. 3B to the line from FIG. 3A to determine the spatial distance between the two lines, e.g., the Hausdorff distance or the Fréchet distance, and may determine, based on the spatial distance being below a certain threshold spatial distance, that the new vehicle trip included the turn of interest.

Figure 3C:
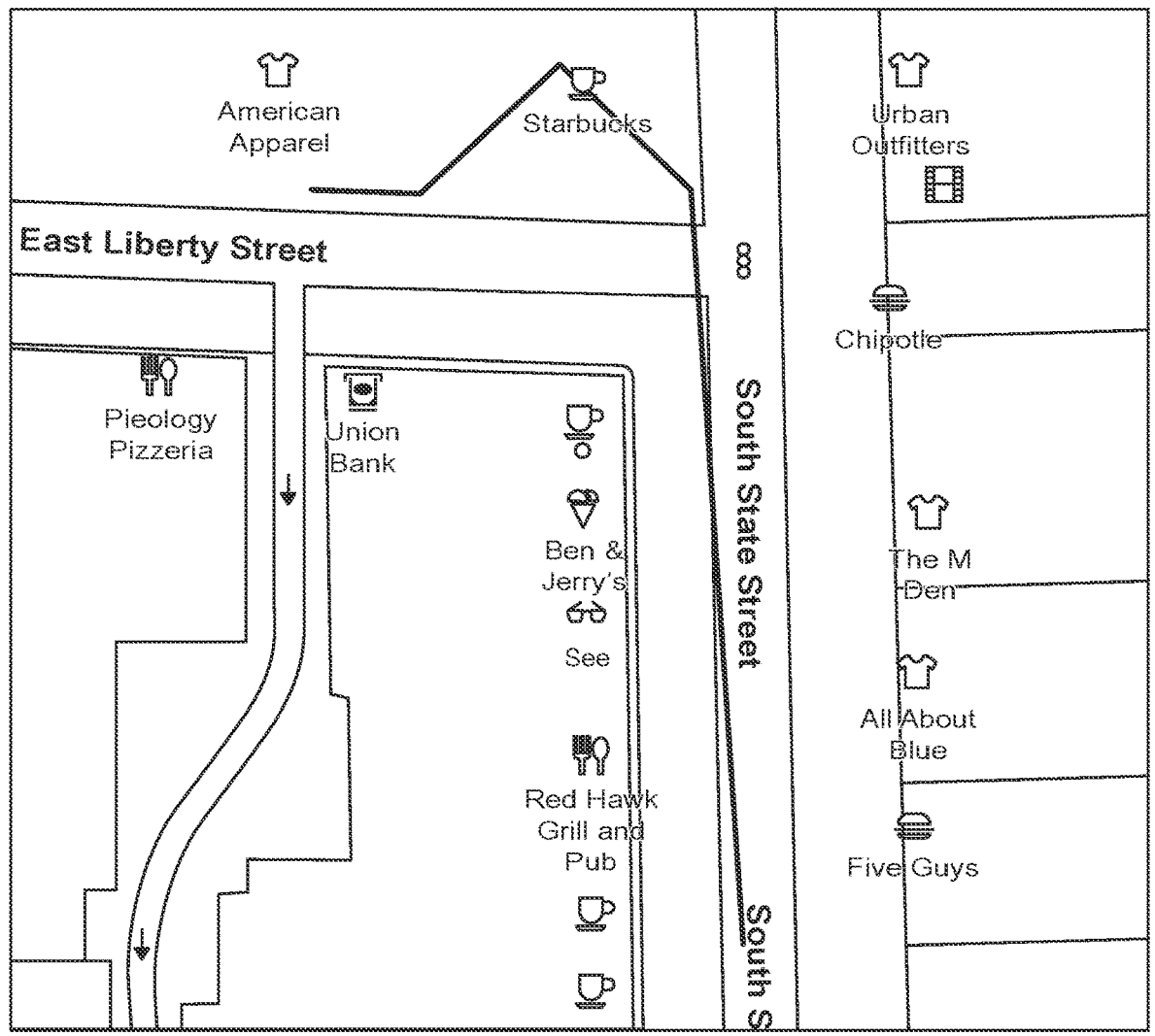
FIG. 3C illustrates a diagram of an example vehicle path through an intersection that may be compared to the example spatial average vehicle path through the intersection of FIG. 3A to determine that the vehicle likely did not make the same turn through the intersection, in accordance with some embodiments.

FIG. 3C illustrates a rendering of an example line representative of a turn made by a vehicle 102 during a new vehicle trip. The average spatial path application 116 may compare the line from FIG. 3C to the line from FIG. 3A to determine the spatial distance between the two lines, and may determine, based on the spatial distance being above a certain threshold spatial distance, that the new vehicle trip did not include the turn of interest, or that the vehicle 102 made the turn of interest unsafely. For example, as shown in FIG. 3C, the vehicle 102 may have turned from South State Street into a parking lot, e.g., to visit Starbucks, rather than turning from South State Street onto East Liberty Street. Or, the vehicle 102 may have made an unsafe turn from South State Street onto East Liberty Street.

Furthermore, the computer-readable instructions stored on the memory 114 may include instructions for carrying out any of the steps of the method 400, described in greater detail below with respect to FIG. 4.

Figure 4:
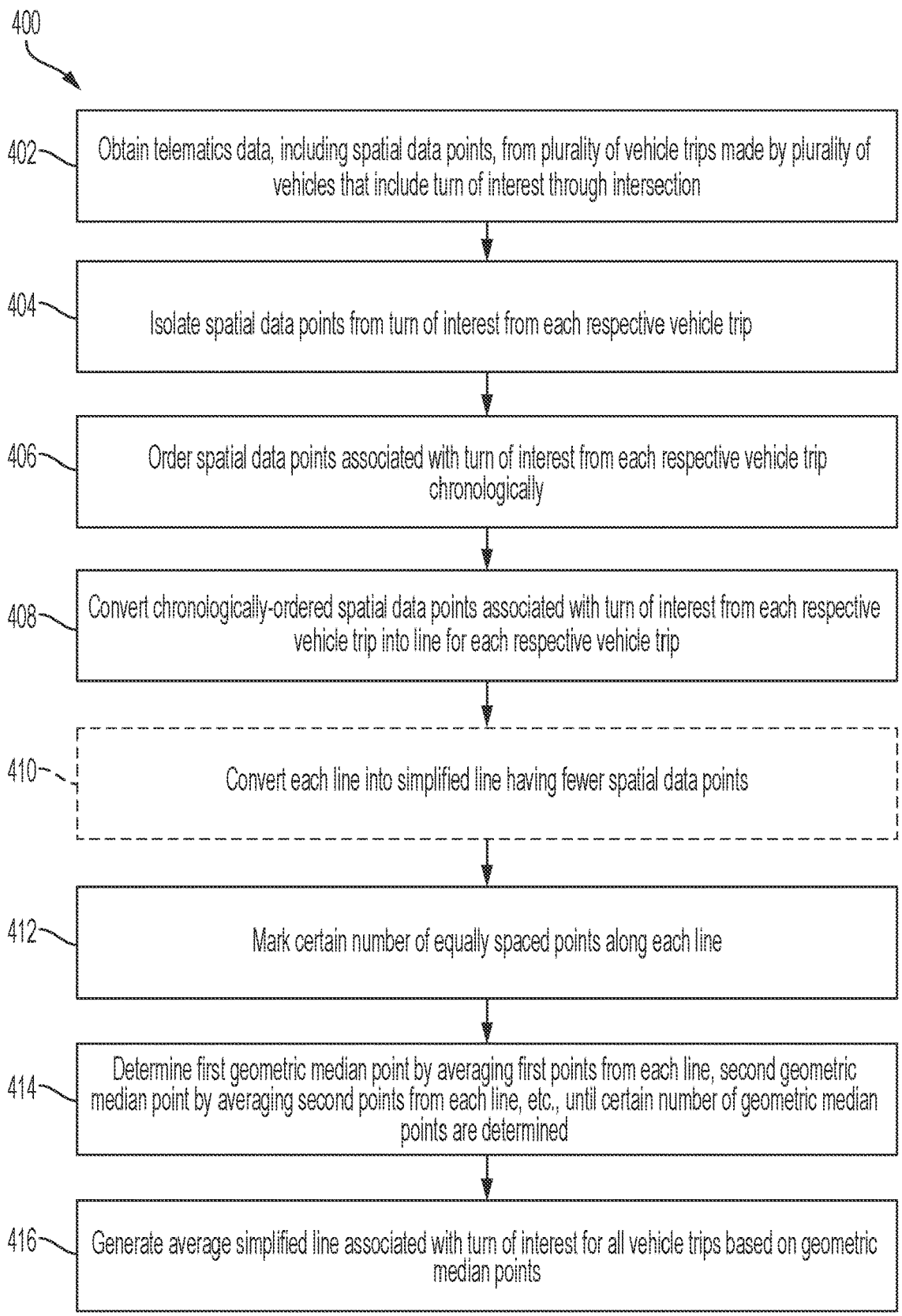
FIG. 4 illustrates a flow diagram of an example method for collapse of driving data to determine spatial averages of vehicle paths within an intersection, in accordance with some embodiments.

FIG. 4 illustrates a flow diagram of an example method 400 for collapse of driving data to determine spatial averages of vehicle paths within an intersection, in accordance with some embodiments. One or more steps of the method 400 may be implemented as a set of instructions stored on a computer-readable memory 114 and executable on one or more processors 112.

The method may begin when telematics data from a plurality of vehicle trips made by a plurality of vehicles that include a turn of interest through a particular intersection is obtained (block 402). For instance, the turn of interest may be a North-East turn through a particular intersection, or a South-West turn through a particular intersection, etc. The telematics data may include a plurality of spatial data points for each respective vehicle trip. Each spatial data point may indicate a vehicle position (e.g., GPS coordinates) and an associated time from a particular vehicle's trip. In some examples, other telematics data (such as, e.g., speed data, acceleration data, braking data, or other vehicle sensor data) may also be associated with each spatial data point.

The spatial data points associated with the turn of interest may be isolated (block 404). For example, spatial data representative of a boundary associated with a particular intersection may be obtained, and the boundary associated with the particular intersection may be compared to the spatial data points from each vehicle trip, such that spatial data points from each vehicle trip within the boundary associated with the intersection are included and spatial data points from each vehicle trip outside of the boundary associated with the intersection are excluded. The remaining spatial data points are thus the portions of each vehicle trip that include the intersection. These spatial data points from the portion of each vehicle trip that includes the intersection may be ordered chronologically and a simplified line may then be generated for the portion of each vehicle trip that includes the intersection. These new simplified lines may then be divided into three equal segments. An angle measurement from 0 to 360 may be determined for both the first segment (i.e., the first third) and the last segment (i.e., the last third) of each line, from each vehicle trip. The directions associated with the turns through the intersection from each vehicle trip may then be determined based on these two angle measurements. Thus, the spatial data points from each vehicle trip that includes a particular direction turn through a particular intersection (e.g., a North-West turn through a particular intersection) may be isolated, so that spatial data from vehicle trips that do not pass through the intersection, and spatial data from vehicle trips that make different direction turns through the intersection are excluded from the isolated spatial data points.

Additionally, in some examples, any duplicate spatial data points associated with the turn of interest from any single vehicle trip may be deleted. For instance, duplicate spatial data points from a single vehicle trip may indicate that a vehicle is stopped during the trip.

The isolated sets of spatial data points associated with the turn of interest from each respective vehicle trip may each be ordered (block 406) chronologically, e.g., based on the time associated with each spatial data point. That is, a first set of spatial data points associated with the turn of interest from a first vehicle trip may be ordered chronologically, a second set of spatial data points associated with the turn of interest from a second vehicle trip may be ordered chronologically, etc.

The chronologically-ordered spatial data points associated with the turn of interest from each respective vehicle trip may be converted (block 408) into a first line for each respective vehicle trip. Optionally, each of the first lines associated with the turn of interest from each respective vehicle trip may then be converted (block 410) into simplified lines associated with the turn of interest for each respective vehicle trip. For instance, the simplified lines may each have fewer spatial data points than the first lines. The simplified lines may require less storage space in the memory 114, and thus may improve the processing time as the processor 112 executes instructions related to the simplified lines from the memory 114 (i.e., compared to the processor 112 executing instructions related to the first lines from the memory 114).

A particular number of equally spaced points may be marked (block 412) or placed along each of the (first or simplified) lines associated with the turn of interest for each respective vehicle trip, such that each of the points are marked at linear fractions of the line at regular intervals. For example, the particular number may be five, or ten, or twenty (or any other number), and the each point may be, e.g., an interval of 20%, 10%, or 5% of the line from the next point. Accordingly, in some examples, five (or ten, or twenty) equally spaced points may be placed along each of the simplified lines associated with the turn of interest for each respective vehicle trip. That is, five (or ten, or twenty) equally spaced points are placed along a first simplified line associated with the turn of interest for a first vehicle trip, and five (or ten, or twenty) equally spaced points are placed along a second simplified line associated with the turn of interest for a second vehicle trip, and five (or ten, or twenty) equally spaced points are placed along a third simplified line associated with the turn of interest for a third vehicle trip, etc., such that each of the simplified lines associated with the turn of interest for each vehicle trip are marked with the same number of equally spaced points.

The same particular number (e.g., five, or ten, or twenty, or any other number, as discussed above with respect to block 412) of geometric median points may be determined (block 414) by averaging each of the marked equally spaced points from each of the simplified lines associated with the turn of interest for each vehicle trip, e.g., using the Weiszfeld algorithm. For instance, if each of the simplified lines associated with the turn of interest for each vehicle trip is marked with five equally spaced points, five geometric median points may be determined. The first geometric median point will be the average of the first marked point, placed 20% along each of the simplified lines associated with the turn of interest for each respective vehicle trip, the second geometric median point will be the average of the second marked point, placed 40% along each of the simplified lines associated with the turn of interest for each respective vehicle trip, the third geometric median point will be the average of the third marked point, placed 60% along each of the simplified lines associated with the turn of interest for each respective vehicle trip, etc.

An average simplified line associated with the turn of interest may be generated (block 416) for all of the vehicle trips based on the geometric median points. For instance, this average simplified line may be a line representative of a path through each of the geometric median points. That is, this average simplified line may be created by joining the geometric median points into a line ordered by the fraction sequence, e.g., when there are 5 geometric median points averaged from points marked at intervals of 20% of the line from one another, geometric median point averaged from the points at 20% of the line may be joined to the geometric median point averaged from the points at 40% of the line, which may in turn be joined to the geometric median point averaged from the points at 60% of the line, etc., up to the geometric median point averaged from the points at 100% of the line. In this way, the average simplified line may be created by joining the geometric median points in chronological order. In some examples, this average simplified line may then be used as the spatial average path of the turn of interest through the intersection.

In some examples, a spatial distance may be calculated between the generated average simplified line associated with the turn of interest for all of the vehicle trips and each of the simplified lines associated with the turn of interest from each respective vehicle trip. Any of the simplified lines associated with the turn of interest from each respective vehicle trip that have a spatial distance that is greater than a threshold spatial distance when compared to the average simplified line associated with the turn of interest may then be excluded as an updated average simplified line associated with the turn of interest is calculated by joining the geometric median points from the simplified lines from all remaining vehicle trips in the same manner as discussed above, but excluding geometric median points associated with any deleted simplified lines.

In some examples, calculating this spatial distance includes calculating a Hausdorff distance or a Fréchet distance between the two lines. Generally speaking, a Hausdorff distance, or Hausdorff metric, also called Pompeiu-Hausdorff distance, measures how far two subsets of a metric space are from each other, and a Fréchet distance is a measure of similarity between curves that takes into account the location and ordering of the points along the curves.

Moreover, in some examples, calculating this spatial distance includes dividing each of the original simplified lines into a number of segments equal to the number of geometric median points that were used to generate the average simplified line, and comparing each segment of each of the original simplified lines to the corresponding segment of the average simplified line. For instance, the distance of each node on each of the original simplified lines may be compared to the corresponding node of the average simplified line, and minimum, maximum, and average distances between each of the node from original simplified lines and the corresponding node of the average simplified line may be determined. Similarly, the angles (e.g., 0-360) of each segment on each of the original simplified lines may be compared to the angle of the corresponding segment of the average simplified line to determine a difference in angles, and minimum, maximum, and average differences in angles between each of the segments on each of the original simplified lines and the corresponding segment of the average simplified line may be determined. In this case, original simplified lines for which the node distances or angle differences exceed threshold values may be excluded.

This process may iteratively continue until there are no remaining simplified lines that have a spatial distance that is greater than the threshold distance when compared to the final updated average simplified line associated with the turn of interest. Thus, in some examples, this final updated average simplified line associated with the turn of interest may be used as the spatial average path of the turn of interest through the intersection.

In some examples, telematics data associated with a new vehicle trip may be obtained. As with the telematics data discussed with respect to block 402, the telematics data associated with the new vehicle trip may include a plurality of spatial data points. Comparing the new vehicle trip to the average spatial path may be done in the same manner as comparing the original simplified lines to the average simplified line, as discussed above, i.e., by calculating a Hausdorff or Frechet distance between the new vehicle trip and the average spatial path, or by segmenting the line representative of the new vehicle trip into the same number of segments, and comparing node distances and/or angle differences to determine if any thresholds are exceeded. If no spatial distance thresholds are exceeded, a determination may be made that the new vehicle's trip included the turn of interest. In contrast, if the spatial distance thresholds are exceeded, a determination may be made that the new vehicle's trip did not include the turn of interest. For instance, if the new vehicle's trip included a U-turn through the intersection and no actual turn through the intersection, the new vehicle's trip did not include the turn of interest. As another example, if the new vehicle's trip included only a different turn through the intersection, the new vehicle's trip did not include the turn of interest. As still another example, if the new vehicle's trip includes a turn into a parking lot near the intersection rather than a turn through the intersection, the new vehicle's trip did not include the turn of interest.

If the new vehicle's trip included the turn of interest, the spatial data points associated with the new vehicle trip may be compared to the generated average simplified line associated with the turn of interest to identify any deviations between the turn of interest as performed by a driver associated with the new vehicle trip and the generated average simplified line associated with the turn of interest. For instance, deviations may be indicative of different driving habits than average. In some examples, deviations may indicate safer driving habits than average (e.g., slower, wider turns than average), while in other examples, deviations may indicate less safe driving habits than average (e.g., faster, tighter turns than average).

Additionally, in some examples, only the vehicle data from trips that are used in creating the final average simplified line (i.e., none of the vehicle data from trips that were excluded in the iterative process of creating the final average simplified line) may be used in calculating other types of averages associated with the turn through the intersection. For instance, average driving values, such as an average maximum acceleration value, an average maximum speed value, an average braking value, etc., associated with trips through the intersection may be calculated using only telematics data from trips that were used in creating the final average simplified line (i.e., not including any telematics data from trips that were excluded). In this way, the average driving values are not skewed by outlier trips through the intersection, or trips that did not actually include the particular turn through the intersection (e.g., U-turns, or turns into nearby parking lots, etc.). These average driving values can then be compared to driving values for a new trip through the turn of the intersection to determine if the vehicle's maximum acceleration, speed, braking, etc., through the turn of the intersection during the new trip was average, below average, above average, etc.

Moreover, in some examples, multiple average driving values may be determined for various times of day, such as an average acceleration for early morning, an average acceleration for morning rush hour, an average acceleration for daytime, an average acceleration for evening rush hour, an average acceleration for night, etc., or an average acceleration (or other driving value) hour-by-hour. These average driving values for various times of day or various hours can then be compared to driving values for a new trip through the turn of the intersection at the same time of day or during the same hour to determine if the vehicle's maximum acceleration, speed, braking, etc., through the turn of the intersection during the new trip was average, below average, above average, etc., for that time of day. For example, this analysis may be used to determine instances in which drivers are driving at high speeds in an intersection that is associated with a school zone, bus stop, or other specific location at times of day during which a slower speed is required.

Accordingly, in some examples, an insurance premium for the driver associated with the new vehicle trip may be adjusted based on any identified deviations between the turn of interest as performed by the driver associated with the new vehicle trip and the generated average simplified line associated with the turn of interest. Additionally, in some examples, an insurance premium for the driver associated with the new vehicle trip may be adjusted based on any driving values during the turn of interest that are above average (or significantly above average) for the turn of interest generally, and/or above average based on time of day, as discussed above.

Additionally, the techniques provided herein may also be used to derive road data from driving data on non-intersection road segments with the same start and end points, in some examples. On longer and more complex road shapes, the methods described herein would include additional segments, e.g., with each segment about 10 feet in length, and the total number of segments calculated as a proportion of the total length.

With the foregoing, an insurance customer may opt-in to a rewards, insurance discount, or other type of program. After the insurance customer provides their affirmative consent, an insurance provider remote server may collect data from the customer's mobile device or other smart devices—such as with the customer's permission or affirmative consent. The data collected may be related to insured assets before (and/or after) an insurance-related event, including those events discussed elsewhere herein. In return, risk averse insureds may receive discounts or insurance cost savings related to home, renters, personal articles, auto, and other types of insurance from the insurance provider.

In one aspect, data, including the types of data discussed elsewhere herein, may be collected or received by an insurance provider remote server, such as via direct or indirect wireless communication or data transmission from a mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the foregoing text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method, comprising:
obtaining, by a processor, telematics data from a plurality of vehicle trips made by a plurality of vehicles that each include a same particular turn of interest through a particular intersection, the telematics data including a plurality of spatial data points for each respective vehicle trip;
isolating, by the processor, from the spatial data points for each respective vehicle trip, the spatial data points associated with the particular turn of interest from each respective vehicle trip;
ordering, by the processor, each set of isolated spatial data points associated with the particular turn of interest from each respective vehicle trip chronologically;
converting, by the processor, the chronologically ordered spatial data points associated with the particular turn of interest from each respective vehicle trip into a first line for each respective vehicle trip;
converting, by the processor, the first line associated with the particular turn of interest for each respective vehicle trip into a simplified line associated with the particular turn of interest for each respective vehicle trip, each of the respective simplified lines having fewer spatial data points than each of the respective first lines;
marking, by the processor, a particular number of equally spaced points along each of the simplified lines associated with the particular turn of interest for each respective vehicle trip, such that each of the points are marked at linear fractions of the line at regular intervals;
determining, by the processor, a particular number of geometric median points, with each geographic median point being an average of a respective one of the particular number of equally spaced points placed at a particular linear fraction along the simplified lines associated with the particular turn of interest from each of the vehicle trips;
generating, by the processor, an average simplified line associated with the particular turn of interest for all of the vehicle trips by joining the geometric median points together in order of the linear fractions of the lines;
obtaining, by the processor, telematics data associated with a new vehicle trip, wherein the new vehicle trip is an already-completed vehicle trip, the telematics data including a plurality of spatial data points for the new vehicle trip; and
comparing, by the processor, the spatial data points for the new vehicle trip to the average simplified line associated with the particular turn of interest to determine whether the new vehicle trip includes the particular turn of interest.

2. The computer-implemented method of claim 1, further comprising:
determining, by the processor, respective spatial distances between the generated average simplified line associated with the particular turn of interest for all of the vehicle trips and each of the simplified lines associated with the particular turn of interest from each respective vehicle trip;
deleting, by the processor, any of the simplified lines associated with the particular turn of interest from each respective vehicle trip associated with a spatial distance that is greater than a threshold spatial distance; and
generating, by the processor, an updated average simplified line by joining the geometric median points associated with the simplified lines from all remaining vehicle trips together in order of the linear fractions of the lines, excluding geometric median points associated with any deleted simplified lines.

3. The method of claim 1, further comprising:
deleting, by the processor, any duplicate spatial data points associated with the particular turn of interest from each respective vehicle trip.

4. The method of claim 1, wherein comparing the spatial data points for the new vehicle trip to the average simplified line associated with the particular turn of interest to determine whether the new vehicle trip includes the particular turn of interest includes:
isolating, by the processor, from the spatial data points for the new vehicle trip, the spatial data points associated with the intersection in which the particular turn of interest is located;
generating, by the processor, a simplified line based on the isolated spatial data points for the new vehicle trip associated with the intersection in which the particular turn of interest is located;
calculating, by the processor, a spatial distance between the generated average simplified line associated with the particular turn of interest and the simplified line for the new vehicle trip associated with the intersection in which the particular turn of interest is located; and
determining, by the processor, that the new vehicle trip includes the particular turn of interest based on the calculated Hausdoff distance being less than a threshold spatial distance.

5. The method of claim 1, further comprising:
based on determining that the new vehicle trip includes the particular turn of interest, comparing, by the processor, the spatial data points associated with the new vehicle trip to the generated average simplified line associated with the particular turn of interest to identify any deviations between the particular turn of interest as performed by a driver associated with the new vehicle trip and the generated average simplified line associated with the particular turn of interest.

6. The method of claim 5, further comprising:
adjusting, by the processor, an insurance premium associated with the driver associated with the new vehicle trip based on any identified deviations between the particular turn of interest as performed by the driver associated with the new vehicle trip and the generated average simplified line associated with the particular turn of interest.

7. A non-transitory computer-readable storage medium comprising instructions that, when executed, cause a machine to:
obtain telematics data from a plurality of vehicle trips made by a plurality of vehicles that each include a same particular turn of interest through a particular intersection, the telematics data including a plurality of spatial data points for each respective vehicle trip;
isolate, from the spatial data points for each respective vehicle trip, the spatial data points associated with the particular turn of interest from each respective vehicle trip;
order each set of isolated spatial data points associated with the particular turn of interest from each respective vehicle trip chronologically;

convert the chronologically ordered spatial data points associated with the particular turn of interest from each respective vehicle trip into a first line for each respective vehicle trip;

convert the first line associated with the particular turn of interest for each respective vehicle trip into a simplified line associated with the particular turn of interest for each respective vehicle trip, each of the respective simplified lines having fewer spatial data points than each of the respective first lines;

mark a particular number of equally spaced points along each of the simplified lines associated with the particular turn of interest for each respective vehicle trip, such that each of the points are marked at linear fractions of the line at regular intervals;

determine a particular number of geometric median points, with each geographic median point being an average of a respective one of the particular number of equally spaced points placed at a particular linear fraction along the simplified lines associated with the particular turn of interest from each of the vehicle trips;

generate an average simplified line associated with the particular turn of interest for all of the vehicle trips by joining the geometric median points together in order of the linear fractions of the line;

obtain telematics data associated with a new vehicle trip, wherein the new vehicle trip is an already-completed vehicle trip, the telematics data including a plurality of spatial data points for the new vehicle trip; and compare the spatial data points for the new vehicle trip to the average simplified line associated with the particular turn of interest to determine whether the new vehicle trip includes the particular turn of interest.

8. The non-transitory computer-readable storage medium of claim 7, including further instructions that, when executed, cause the machine to:

determine respective spatial distances between the generated average simplified line associated with the particular turn of interest for all of the vehicle trips and each of the simplified lines associated with the particular turn of interest from each respective vehicle trip;

delete any of the simplified lines associated with the particular turn of interest from each respective vehicle trip associated with a spatial distance that is greater than a threshold spatial distance; and generate an updated average simplified line by joining the geometric median points associated with the simplified lines from all remaining vehicle trips together in order of the linear fractions of the line, excluding geometric median points associated with any deleted simplified lines.

9. The non-transitory computer-readable storage medium of claim 7, including further instructions that, when executed, cause the machine to:

delete any duplicate spatial data points associated with the particular turn of interest from each respective vehicle trip.

10. The non-transitory computer-readable storage medium of claim 7, wherein the instructions, when executed, cause the machine to compare the spatial data points for the new vehicle trip to the average simplified line associated with the particular turn of interest to determine whether the new vehicle trip includes the particular turn of interest by:

isolating, from the spatial data points for the new vehicle trip, the spatial data points associated with the intersection in which the particular turn of interest is located;

generating a simplified line based on the isolated spatial data points for the new vehicle trip associated with the intersection in which the particular turn of interest is located;

calculating a spatial distance between the generated average simplified line associated with the particular turn of interest and the simplified line for the new vehicle trip associated with the intersection in which the particular turn of interest is located; and determining that the new vehicle trip includes the particular turn of interest based on the calculated Hausdoff distance being less than a threshold spatial distance.

11. The non-transitory computer-readable storage medium of claim 7, including further instructions that, when executed, cause the machine to:

based on determining that the new vehicle trip includes the particular turn of interest, compare the spatial data points associated with the new vehicle trip to the generated average simplified line associated with the particular turn of interest to identify any deviations between the particular turn of interest as performed by a driver associated with the new vehicle trip and the generated average simplified line associated with the particular turn of interest.

12. The non-transitory computer-readable storage medium of claim 11, including further instructions that, when executed, cause the machine to:

adjust an insurance premium associated with the driver associated with the new vehicle trip based on any identified deviations between the particular turn of interest as performed by the driver associated with the new vehicle trip and the generated average simplified line associated with the particular turn of interest.

13. A computing device, comprising a processor and a memory storing instructions that, when executed by the processor, cause the processor to:

obtain telematics data from a plurality of vehicle trips made by a plurality of vehicles that include a same particular turn of interest through a particular intersection, the telematics data including a plurality of spatial data points for each respective vehicle trip;

isolate, from the spatial data points for each respective vehicle trip, the spatial data points associated with the particular turn of interest from each respective vehicle trip;

order each set of isolated spatial data points associated with the particular turn of interest from each respective vehicle trip chronologically;

convert the chronologically ordered spatial data points associated with the particular turn of interest from each respective vehicle trip into a first line for each respective vehicle trip;

convert the first line associated with the particular turn of interest for each respective vehicle trip into a simplified line associated with the particular turn of interest for each respective vehicle trip, each of the respective simplified lines having fewer spatial data points than each of the respective first lines;

mark a particular number of equally spaced points along each of the simplified lines associated with the particular turn of interest for each respective vehicle trip, such that each of the points are marked at linear fractions of the line at regular intervals;

determine a particular number of geometric median points, with each geographic median point being an average of a respective one of the particular number of equally spaced points placed at a particular linear fraction along the simplified lines associated with the particular turn of interest from each of the vehicle trips;

generate an average simplified line associated with the particular turn of interest for all of the vehicle trips by joining the geometric median points together in order of the linear fractions of the line;

obtain telematics data associated with a new vehicle trip, wherein the new vehicle trip is an already-completed vehicle trip, the telematics data including a plurality of spatial data points for the new vehicle trip; and compare the spatial data points for the new vehicle trip to the average simplified line associated with the particular turn of interest to determine whether the new vehicle trip includes the particular turn of interest.

14. The computing device of claim 13, wherein the memory further includes instructions that, when executed, cause the processor to:

determine respective spatial distances between the generated average simplified line associated with the particular turn of interest for all of the vehicle trips and each of the simplified lines associated with the particular turn of interest from each respective vehicle trip;

delete any of the simplified lines associated with the particular turn of interest from each respective vehicle trip associated with a spatial distance that is greater than a threshold spatial distance; and generate an updated average simplified line by joining the geometric median points associated with the simplified lines from all remaining vehicle trips together in order of the linear fractions of the line, excluding geometric median points associated with any deleted simplified lines.

15. The computing device of claim 13, wherein the memory further includes instructions that, when executed, cause the processor to:

delete any duplicate spatial data points associated with the particular turn of interest from each respective vehicle trip.

16. The computing device of claim 13, wherein the instructions, when executed, cause the processor to compare the spatial data points for the new vehicle trip to the average simplified line associated with the particular turn of interest to determine whether the new vehicle trip includes the particular turn of interest by:

isolating, from the spatial data points for the new vehicle trip, the spatial data points associated with the intersection in which the particular turn of interest is located;

generating a simplified line based on the isolated spatial data points for the new vehicle trip associated with the intersection in which the particular turn of interest is located;

calculating a spatial distance between the generated average simplified line associated with the particular turn of interest and the simplified line for the new vehicle trip associated with the intersection in which the particular turn of interest is located; and determining that the new vehicle trip includes the particular turn of interest based on the calculated Hausdoff distance being less than a threshold spatial distance.

17. The computing device of claim 13, wherein the memory further includes instructions that, when executed, cause the processor to:

based on determining that the new vehicle trip includes the particular turn of interest, compare the spatial data points associated with the new vehicle trip to the generated average simplified line associated with the particular turn of interest to identify any deviations between the particular turn of interest as performed by a driver associated with the new vehicle trip and the generated average simplified line associated with the particular turn of interest.

* * * * *